United States Patent

[11] 3,633,598

[72] Inventors: Aubrey J. Morris, Devizes; James S. W. Fox, Southampton, both of England
[21] Appl. No.: 21,022
[22] Filed: Mar. 19, 1970
[45] Patented: Jan. 11, 1972
[73] Assignee: Ambuco Limited, London, England
[32] Priority: Mar. 25, 1969
[33] Great Britain
[31] 15,663/69

[54] METHOD AND APPARATUS FOR INSERTING A VALVE MEMBER BETWEEN FLANGES OF A FLANGED PIPE CONNECTION
24 Claims, 4 Drawing Figs.

[52] U.S. Cl. .................................................. 137/15, 29/157.1 R, 29/213, 29/401, 137/315
[51] Int. Cl. ........................................................ F16l 55/18, B23p 19/04

[50] Field of Search ........................................ 29/401, 404, 157.1 R, 213; 137/15, 315

[56] References Cited
UNITED STATES PATENTS

| | | | |
|---|---|---|---|
| 587,092 | 7/1897 | French | 29/213 |
| 2,396,964 | 3/1946 | O'Brien | 29/213 |
| 2,770,532 | 11/1956 | Mason | 29/213 X |

Primary Examiner—John F. Campbell
Assistant Examiner—D. C. Reiley
Attorney—Larson, Taylor and Hinds ABSTRACT: Apparatus and method for inserting a spade valve member between the flanges of a joint in a fluid-containing conduit to vary the flow of fluid, in which a divided casing is placed around the conduit and contains the spade valve and the flanges, the casing having means for securing its parts together, means for separating and refastening the flanges of the joint and means for moving the spade valve between the flanges.

METHOD AND APPARATUS FOR INSERTING A VALVE MEMBER BETWEEN FLANGES OF A FLANGED PIPE CONNECTION

This invention relates to apparatus for and a method of inserting between the flanges of a flanged joint connecting together two conduits, a valve member adapted to prevent or reduce a flow of fluid through the conduits when inserted.

In chemical processing plants which have many conduits for conveying fluids under pressure it is often necessary to cut off the flow of fluid through a part of a conduit in order to be able to carry out inspection and/or repair on a part of the plant. It is not always possible to provide adjustable valves at every part of the plant installation due to the high costs of such valves and in integrated chemical plants for carrying out a multiplicity of chemical processes it is often necessary to shutdown the whole plant in order to carry out work on a part of the plant which can not be cut off by using the existing adjustable valves provided. The closing down of such a plant is expensive and in order to be able to restart the plant as quickly as possible it is known to insert spade valves between the flanged joints of some conduits in order to cut out the part of the plant to be worked on and thus allow the remainder of the plant to be restarted. However such spade valves can only be inserted in the flanged joints when the conduit has either been drained and/or depressurized which necessitates temporary shut down of the plant, especially where the conduits contain a poisonous or toxic fluid.

The term "spade valve" used throughout the Specification and claims means a platelike valve member which can have therein an opening and which in one inserted position prevents a flow of fluid through the conduits and which, if provided with an opening, can be moved to another position to bring the opening in register with the bore of the conduits to allow a full flow or a restricted flow through the conduits.

According to the present invention there is provided apparatus for inserting between the flanges of a flanged joint in a conduit containing a fluid, a spade valve member adapted to close the conduit or reduce a flow of fluid therethrough, comprising a divided casing adapted to contain said spade valve and be placed around the conduit so as to contain said flanges, means for securing the parts of the divided casing together, means extending through said casing for unfastening and refastening the means for securing the flanges of said joint together and means provided on said casing for moving the spade valve between the flanges of said joint.

The casing is preferably divided into two parts with the line of division, when the two parts are placed around the conduit, being contained in a plane containing the axis of the flanged joint.

The casing may be provided with packings adapted to seal against the outer periphery of the conduits. Means can be provided for compressing the packings in order to provide an effective seal. The packings are perfectly divided on a line located in a plane transverse to the plane of the division of the casing. Said means for compressing the packings may comprise divided bushes.

The means for unfastening and refastening the bolts holding the two flanges together may comprise a plurality of spanner devices each carried on a rod extending through an end wall of the casing and adapted to be engaged by any suitable means at their outer end for applying torque thereto. Preferably the rods extend through packings.

Means for separating the flanges may be provided on the leading edge of the spade valve.

The means for moving the spade valve between the flanges may comprise a rod or rods connected at one end to the valve and extending through an end wall of the casing, said rod or rods being moved axially by axial forces applied thereto by any suitable force-producing means located externally of the casing.

According to the present invention in another aspect there is provided a method of inserting a spade valve between the flanges of a flanged joint in a conduit containing a fluid comprising the steps of securing to one flange the nuts of bolts securing the two flanges together, assembling around the conduit a divided casing containing a spade valve, securing the parts of the divided casing together, operating spanner means extending through said casing in order to unfasten all and remove some or all of the bolts, operating means provided on said casing for moving said spade valve between said flanges and then reinstating said bolts and refastening said bolts to clamp said flanges together with said spade valve interposed therebetween.

One embodiment of the present invention will now be described with reference to the accompanying drawings, in which.

Figure 1:
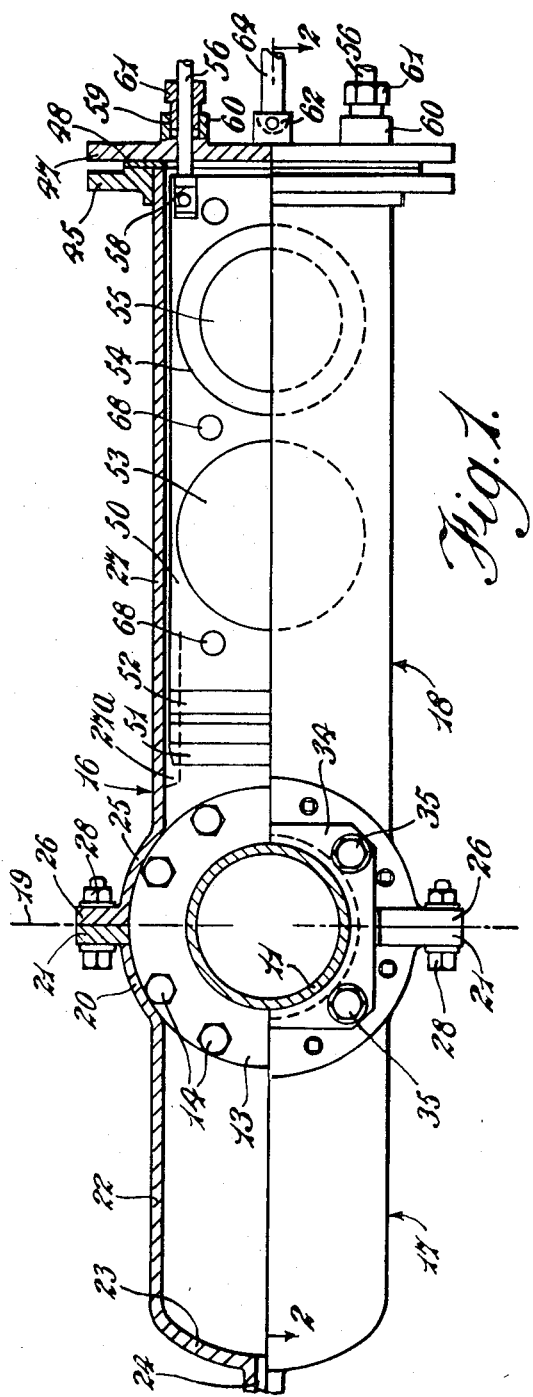
FIG. 1 is a side view of the apparatus with the upper half of the drawings being shown in section and the lower half in elevation.
Figure 2:
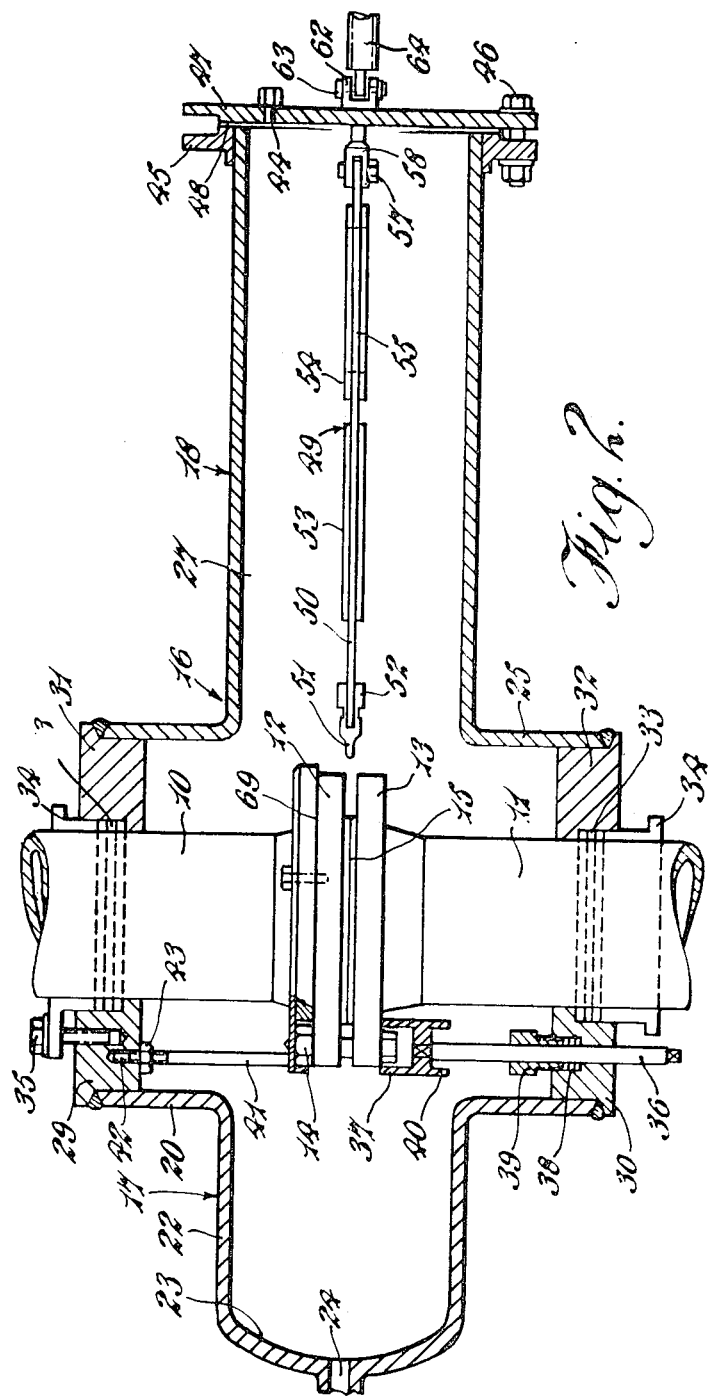
FIG. 2 is a section taken along the line 2—2 indicated on FIG. 1.

FIGS. 1 and 2 show a pair of conduits 10 and 11 which are provided with radially extending flanges 12 and 13 and which are clamped together by nuts and bolts 14. Between the two flanges 12 and 13 there is provided a sealing gasket 15.

The apparatus comprises a casing 16 which is divided into two casing parts 17 and 18 along a plane 19 which passes through the axis of the conduits 10 and 11. The casing part 17 comprises a part circular portion 20 to which is secured flanges 21 and a cylindrical portion 22 which extends at right angles to the portion 20 and which is closed by an end wall 23 provided with a bore 24 which can be connected to a pressure relief valve (not shown) which may open to atmosphere or to a drain line depending upon the type of fluid contained in the conduits 10 and 11.

The casing part 18 comprises a part circular portion 25 having flanges 26 and a cylindrical portion 27 which extends at right angles to the portion 25. The part circular portions 20 and 25 are brought together around the conduits 10 and 11 and the flanges 21 are clamped to the flanges 26 by nuts and bolts 28. At the ends of the part circular portion 20 are part circular end walls 29 and 30 which abut against part circular end walls 31 and 32 respectively provided at the ends of the part circular portion 25. The end walls 29, 30, 31 and 32 are recessed to receive packing rings 33 held in place by split gland bushes 34. The packing rings 33 and gland bushes 34 are divided along a horizontal plane as view in FIG. 1 so that the line of division is displaced 90° with respect to the line of division of the casing 16. The split gland bushes 34 are held in position by bolts or setscrews 35 which, when tightened, cause the gland bushes 34 to compress the packing rings 33 so that they effectively seal against the conduits 10 and 11. A strap or bar (not shown) may be connected across the split gland bushes 34 to evenly distribute the load thereon when tightening the bolts 35 and prevent the gland bushes 34 from tipping.

Extending through end wall portions 30 and 32 are a plurality of rods 36 each having at its inner end a spanner member 37 adapted to be engaged with the head of one of the bolts 14 which clamp the flanges 12 and 13 together. Each spanner member 37 is connected by a universal torque transmitting coupling 37a with the associated rod 36. It will be appreciated that the number of rods 36 and spanners 37 are equal to the number of bolts 14 and arranged on a similar pitch circle. The coupling 37a allows for any error of alignment of a spanner member 37 and bolt 14 to be catered for. Each rod 36 extends through packing rings 38 which are held in place by a bush 39 surrounding the rod 36. The bush 39 can be tightened by a rearwardly extending portion 40 of the spanner member 37.

Extending from the wall portions 39 and 31 and wall portions 30 and 32 are a plurality of rods 41 (only one of which is shown in the drawings) and which are in screw-threaded engagement with bores 42 and each locked in position by a locknut 43. The rods 41 serve as devices for limiting the axial movement of the flanges, thus limiting the separating distance between the two flanges 12 and 13. The rods 41 can be dispensed with of not required.

The cylindrical portion 27 is provided at its end with a radially extending flange 45 to which is secured by bolts 46, a cover plate 47, a sealing gasket 48 being provided between the flange 45 and cover plate 47. The plate 47 is provided with a connection 44 to enable the casing to be pressurized and tested for leaks before the pipe flange connection is broken. Housed within the cylindrical portion 27 is a spade valve 49 comprising a plate 50 having at its forward edge a tapered member 51 which, when forced between the flanges 12 and 13, causes them to separate. The tapered member 51 is followed by a scraper blade portion 52 which, when forced between the flanges 12 and 13 scrapes away the sealing gasket 15. The plate 50 has a raised circular portion 53 on each side and also a raised circular portion 54 having an aperture 55 therethrough.

The plate 50 is supported in guides 27a provided on the cylindrical portion 27 and at its rear end the plate 50 is connected to two rods 56 by means of bolts or pins 57 which pass through holes provided in the plate 50 and engage with forked ends 58 secured to the rods 56. The rods 56 extend through the cover plate 47 and through packing rings 59 provided in glands 60 provided on the cover plate 47, the rings 59 being compressed by a gland bush 61 in screw-threaded engagement with each gland 60.

Figure 3:
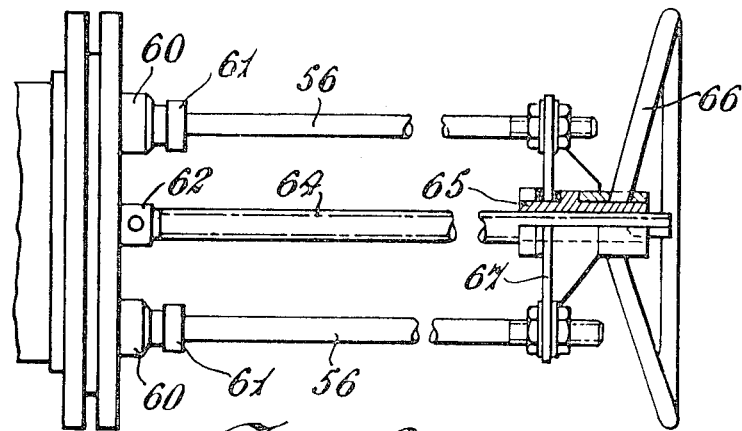
FIG. 3 is an elevation of suitable means for moving the blade valve.

Secured to the cover plate 47 is a forked member 62 to which is secured by a pin 63 a screw-threaded rod 64. As will be seen more clearly from FIG. 3 engaged with the rod 64 is a nut 65 to which is secured a handwheel 66. Mounted on the nut 65 is a plate 67 which is clamped to each of the rods 56, the nut 65 being rotatable relative to the plate 67. It will be appreciated that rotation of the handwheel 66 will cause the nut 65 to move along the rod 64 and the plate 67 will cause the rods 56 to be moved longitudinally, thus moving the spade valve 49 along the guides 27a.

Instead of providing a hand operated mechanical means for moving the rods 56 they may be moved by any suitable pneumatic or hydraulic device mounted on the cover plate 47. Holes 68 are provided in the plate 50. Prior to installing the casing 16 around the conduits 10 and 11 a divided locking plate 69 for holding the nuts of bolts 14 in a position of the flange 12 is secured to the flange 12 either by welding or bolting it thereto. The divided locking plate 69 is provided with hexagonal apertures in which the nuts are received and a retaining plate is placed on top of the locking plate 69 and held in place by bolts or setscrews which are screwed into the flange 12.

In one method of using the apparatus, the locking plate 69 is first of all fixed to the flange 12 and the spade valve 49 is inserted into the cylindrical casing portion 27 and connected to the forked ends 58 before the part circular portions 20 and 25 are placed around the conduits 10 and 11 and the flanges 21, 26 secured together. When the parts are assembled in the position shown in the drawings the spanners 37 are brought into engagement with the bolts 14 and by applying torque to the outer end of each rod 36 by any suitable torque producing means the bolts 14 are slackened. Any bolts 14 which are in the path of the spade valve 49 are withdrawn. Alternatively all of the bolts 14 are withdrawn. The spade valve 49 is then moved forwardly by operating the handwheel 66 so that the tapered member 51 enters between the flanges 12 and 13 and forces them apart, the amount of separation being limited by the rods 41, when they are provided, contacting the flanges 12 and 13. The scraper 52 removes the gasket 15 during the forward movement of the blade valve 49. Any pressure fluid which leaks from the separated joint is received in the sealed casing 16 and if desired can be conveyed to a drain conduit by connecting the aperture 24 to such a drain via a pressure relief valve. The pressure in the casing 16 balances the fluid pressure in the conduits 10, 11. Preferably the assembled casing 16 is pressure tested for leaks prior to slackening the bolts 14.

The spade valve 49 is moved to a position in which the flat raised portion 53 is aligned with the bores of the conduits 10 and 11 and when in this position the holes 68 will be aligned with the holes in the flanges 12 and 13 from which the bolts 14 have been withdrawn. When the spade valve 49 is in this position the bolts 14 are reinserted and tightened, to clamp the spade valve 49 between the flanges 12 and 13. The casing 16 can then be depressurized and drained and removed from the conduits 10 and 11 leaving the spade valve 49 in the flow blocking position with the portion 54 protruding from the flanges 12 and 13 thereby giving a visual indication that the conduits are blocked. If a conduit is to be permanently blocked then the apertured portion 54 will not be required.

The pressure within the casing 16 after the flanges 12 and 13 have been separated may be such that the forces acting on the spanners 37 make it difficult or impossible to push the rods 36 inwardly by hand and it may be necessary to provide on the end wall portions 30, 32 flanged members enabling a G-clamp type of tool to be used to force the rods 36 inwardly.

When the conduit is to be reopened the casing 16 can be reassembled around the conduits 10 and 11 and after slackening and removing bolts 14 the spade valve 49 can be moved forwardly to align the hole 55 with the bores of the conduits 10 and 11 and then the bolts 14 can be reengaged and tightened. In this position the portion 53 will protrude from the flanges 12 and 13 and give a visual indication that the conduit is again open.

It will be appreciated that the apparatus described can be used in any angular position and can be inserted whilst the conduits 10, 11 are under pressure. This means that when the conduits 10, 11 are part of a chemical processing plant then there is no need to shut down the plant whilst the spade valve 49 is being inserted.

In cases where the tapered member 51 of the spade valve 49 is not provided or is insufficient to force the flanges 12 and 13 apart, the separation of the flanges 12 and 13 can be carried out or assisted by clamping a ring 70 to each or one of the conduits 10 and 11 outside of the casing 16 and providing a jacking device between the ring and the flanges 21, 26 of the casing 16 in order to jack the conduits 10 and 11 apart.

Figure 4:
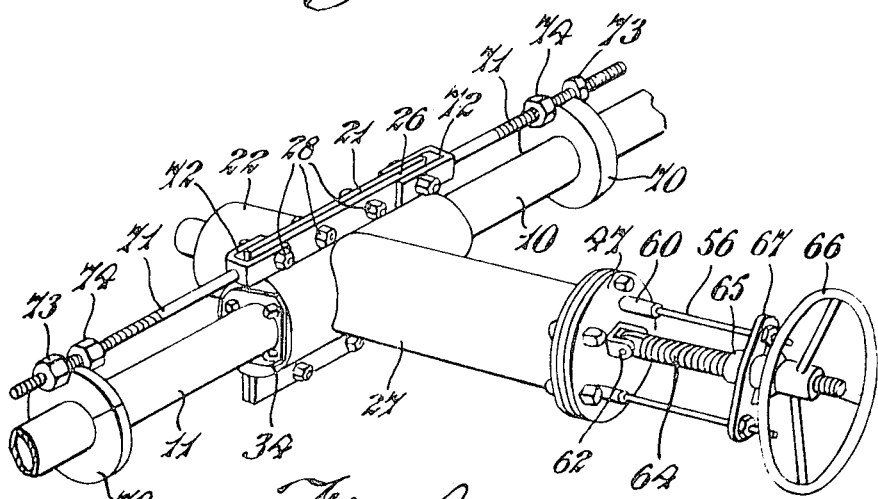
FIG. 4 is a perspective view of the apparatus.

The jacking device is shown in FIG. 4 as comprising a screw-threaded rod 71 connected by a yoke member 72 to the flanges 21, 26 by means of one of the bolts 28, the rod 71 passing through a recess provided in the ring 70 and engaged by nuts 73 and 74 disposed on each side of the ring 70. The nuts 73, 74 are rotated so as to react on the ring 70 to move the conduits and thus the flanges 12, 13 apart.

The spade valve 49 may be of a width equal to the diameter of the flanges 12, 13 and the holes 68 located on a pitch circle equal to the pitch circle of the bolts 14 so that after the spade valve 49 has been inserted all of the bolts 14 can pass through the holes 68 and be retightened.

The guides 27a serve to support the spade valve 49 within the casing 16 when the spade valve is disposed with its width contained in a horizontal plane.

It will be appreciated that the spanner members 37 may comprise any suitable nut engaging means adapted to transmit torque.

The spade valve 49 may be used as a restrictor valve, i.e., it can have an aperture which is of less diameter than the bore of the conduits 10, 11.

We claim:

1. Apparatus for inserting between the flanges of a flanged joint in a conduit containing a fluid, a spade valve member adapted to close the conduit or reduce a flow of fluid therethrough, comprising a divided casing adapted to contain said spade valve and be placed around the conduit so as to contain said flanges, means for securing the parts of the divided casing together, means extending through said casing for unfastening and refastening the means for securing the flanges of said joint together and means provided on said casing for moving the spade valve between the flanges of said joint.

2. Apparatus as claimed in claim 1 in which said casing is divided into two parts with the line of division, when the two parts are placed around the conduit, being contained in a plane containing the axis of the flanged joint.

3. Apparatus as claimed in claim 1 or in which said casing comprises a first cylindrical casing part having at one end a par circular portion which is disposed at right angles to the first cylindrical casing part, said part circular portions disposed at right angles to the first cylindrical casing part and a second cylindrical casing part having at one end a part circular portion disposed at right angles to said second cylindrical casing part, said part circular portions each being provided with outwardly directed flanges adapted to be clamped together when said part circular portions are placed around said conduit.

4. Apparatus as claimed in claim 3 in which each part circular portion is provided with part circular end walls.

5. Apparatus as claimed in claim 4 in which each part circular end wall is provided with a recess adapted to contain sealing means for sealing the end walls with respect to the conduit.

6. Apparatus as claimed in claim 5 in which said sealing means comprises a divided sealing ring or rings held in said recess by a divided gland bush, said ring or rings and said bush being located with their plane of division transverse to the plane of division of said casing.

7. Apparatus as claimed in claim 6 in which the two halves of each gland bush are fixed to the associated part circular end wall by bolts, a strap or bar extending between the two halves.

8. Apparatus as claimed in claim 1 in which said means for unfastening and refastening the means for securing the flanges of said joint together comprises a plurality of spanner devices each carried on one end of a rod extending through said casing, each rod being adapted to be engaged at its outer end by any suitable means for applying torque thereto.

9. Apparatus as claimed in claim 8 in which each spanner device is connected to its associated rod by a torque transmitting universal joint.

10. Apparatus as claimed in claim 8 in which each rod extends through a sealing packing.

11. Apparatus as claimed in claim 10 in which said rod is provided with means for effecting tightening of a bush compressing said sealing packing.

12. Apparatus as claimed in claim 1 in which said spade valve is adapted to be supported in guides provided on the interior of one casing part.

13. Apparatus as claimed in claim 1 in which the means for moving said spade valve between the flanges of said flanged joint comprises a rod or rods which extend through an end wall of the casing, said rod or rods being adapted to be connected to said spade valve and moved axially by a force producing means located externally of said casing.

14. Apparatus as claimed in claim 13 in which the or each rod extends through a sealing packing.

15. Apparatus as claimed in claim 13 in which said force producing means comprises a hand wheel operated mechanical system.

16. Apparatus as claimed in claim 13 in which said force producing means is pneumatically or hydraulically operated.

17. Apparatus as claimed in claim 1 in which said casing is provided with a connection enabling the assembled casing to be pressure tested for leaks.

18. Apparatus as claimed in claim 1 including jacking means adapted to be connected externally to said casing and to said conduit and operative to jack the flanges of the conduits apart.

19. Apparatus as claimed in claim 1 including means for retaining the nuts of the bolts securing the flanges of the joint together on said flanges.

20. Apparatus as claimed in claim 1 including a spade valve provided on its leading edge with means for separating the flanges of the flanged joint when said spade valve is moved towards said flanges.

21. A method of inserting a spade valve between the flanges of a flanged joint in a conduit containing a fluid comprising the steps of securing to one flange the nuts of bolts securing the two flanges together, assembling around the conduit a divided casing containing a spade valve, securing the parts of the divided casing together, operating spanner means extending through said casing in order to unfasten all and remove some or all of the bolts, operating means provided on said casing for moving said spade valve between said flanges and then reinstating said bolts and refastening said bolts to clamp said flanges together with said spade valve interposed therebetween.

22. The method claimed in claim 21 including the step of pressure testing the assembled and secured casing before unfastening said bolts.

23. The method claimed in claim 21 including the step of moving the flanges apart by operating jacking means provided between the casing and said conduit.

24. The method claimed in claim 21 in which the casing is drained and removed after the spade valve has been inserted and the bolts retightened.

* * * * *